United States Patent
Itakura et al.

(10) Patent No.: US 6,354,280 B1
(45) Date of Patent: Mar. 12, 2002

(54) EVAPORATION CONTROL APPARATUS

(75) Inventors: Yuji Itakura, Bucs (GB); Takahiro Yamafuji; Masaya Furushou, both of Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 8 days.

(21) Appl. No.: 09/633,863

(22) Filed: Aug. 7, 2000

(30) Foreign Application Priority Data

Nov. 26, 1999 (JP) ............................................ 11-336578

(51) Int. Cl.⁷ ........................ F02M 33/02; F02M 25/08
(52) U.S. Cl. ................ 123/519; 123/198 D; 137/565.17
(58) Field of Search .............................. 123/514, 516, 123/518, 519, 520, 521, 522, 523, 198 D; 137/565.13, 565.11, 565.34, 588, 592

(56) References Cited

U.S. PATENT DOCUMENTS

| | | | | |
|---|---|---|---|---|
| 4,852,761 A | * | 8/1989 | Turner et al. ................ | 123/519 |
| 4,919,103 A | | 4/1990 | Ishijguro et al. | |
| 5,474,048 A | * | 12/1995 | Yamazaki et al. ........... | 123/519 |
| 5,630,445 A | * | 5/1997 | Horiuchi et al. ............. | 137/592 |
| 5,855,198 A | * | 1/1999 | Nakajima et al. ............ | 123/520 |
| 5,881,698 A | * | 3/1999 | Tuckey et al. ............... | 123/497 |
| 5,901,689 A | * | 5/1999 | Kimura et al. ............... | 123/518 |
| 6,000,426 A | * | 12/1999 | Tuckey et al. ............... | 137/588 |
| 6,182,693 B1 | * | 2/2001 | Stack et al. ............. | 137/565.17 |
| 6,273,070 B1 | * | 8/2001 | Arnal et al. ................. | 123/519 |
| 6,302,144 B1 | * | 10/2001 | Graham et al. ......... | 137/565.17 |

FOREIGN PATENT DOCUMENTS

| | | |
|---|---|---|
| JP | 64-347 A | 1/1989 |
| JP | 2541778 Y2 | 4/1997 |
| JP | 9-195861 A | 7/1997 |
| JP | 10-184476 A | 7/1998 |

* cited by examiner

Primary Examiner—Tony M. Argenbright
Assistant Examiner—Hai Huynh
(74) Attorney, Agent, or Firm—Shinjyu Global IP Counselors, LLP

(57) ABSTRACT

An evaporation control apparatus is provided that reliably suppresses the emission of fuel components into the atmosphere. The evaporation control apparatus has a canister 2 and a control valve 20 that are configured as a unit to be disposed within the fuel tank 1 so that the connection path between the canister 2 and the control valve 20 is completely enclosed within the fuel tank 1. Therefore, fuel components are prevented from permeating the hoses and joints connecting the canister 2 and the control valve 20. In the unlikely event that fuel components should permeate the case body 20A of the control valve 20, emission of the fuel components into the atmosphere will be suppressed.

18 Claims, 7 Drawing Sheets

EVAPORATION CONTROL APPARATUS

BACKGROUND OF THE INVENTION

1. Field of the Invention

This invention generally relates to an evaporation control apparatus for an internal combustion engine. More specifically, the present invention relates to an evaporation control apparatus that prevents fuel vapors within a fuel tank from escaping to the atmosphere.

2. Background Information

There has been known an evaporation control apparatus that is provided with a fuel tank, a canister disposed outside the fuel tank, and a control valve disposed on an evaporation passage that connects the fuel tank and the canister. The canister temporarily stores fuel vapor from the fuel tank. Such an evaporation control apparatus is disclosed in Japanese Laid-open Utility Model Application No. 2541778. A diaphragm control valve has been used conventionally as a control valve in an evaporation control apparatus.

Recently, there has also been considered an evaporation control apparatus in which a large canister is disposed within a fuel tank in order to increase the efficiency with which the canister adsorbs the fuel vapor. Such an evaporation control apparatus is disclosed in Japanese Laid-Open Patent Publication 64-00347. In this arrangement, the control valve is still positioned outside the fuel tank. The case body of the canister and the diaphragm of this kind of control valve are generally made of a resin material. In recent years, it has been found that fuel components such as hydrocarbons may permeate in very small quantities into the resin materials that form the case body of the canister and the diaphragm of the control valve.

In the conventional arrangement, a control valve is provided in an evaporation passage, which is provided outside the fuel tank to connect the fuel tank to the canister. Therefore, as the pressure rises inside the fuel tank and causes the pressure in the evaporation passage to exceed the atmospheric pressure, fuel vapor may permeate and escape from hoses, joints, and other parts that are connected to the control valve. Similarly, when highly concentrated fuel vapor fills the control valve, the pressure within the control valve exceeds the atmospheric pressure. As a result, the fuel vapor may permeate the case body of the canister and the diaphragm of the control valve. Therefore, fuel components contained in the fuel vapor may escape in very small quantities, into the atmosphere from the control valve.

In order to prevent such undesirable dispersion of fuel components, it is possible to make the case body of the canister and the diaphragm of the control valve out of resin materials that are resistant to the permeation and penetration of fuel components. However, such a solution would increase the cost of the evaporation control apparatus.

Particularly in recent years, concern for the environment has resulted in increasingly stringent demands for reducing emissions of fuel vapors and fuel components into the atmosphere. It is therefore necessary to take comprehensive measures to prevent dispersion of these fuel components, even though the amount of dispersion is small.

In view of the above, there exists a need for an evaporation control apparatus which overcomes the above mentioned problems in the prior art. This invention addresses this need in the prior art as well as other needs, which will become apparent to those skilled in the art from this disclosure.

SUMMARY OF THE INVENTION

Accordingly, an object of the present invention is to provide an evaporation control apparatus that reliably suppresses the emission of fuel components into the atmosphere.

The forgoing object of the present invention can be attained by providing an evaporation control apparatus adapted to be arranged in a fuel tank of an internal combustion engine and coupled to a suction system of the internal combustion engine. The evaporation control apparatus comprises a canister and a control valve. The canister contains an adsorbent that temporarily adsorbs fuel vapor generated within the fuel tank of the internal combustion engine. The control valve is fluidly coupled to the canister to supply fuel vapor from the fuel tank to the canister when pressure within the fuel tank exceeds a prescribed pressure. The canister and the control valve are configured as a unit to be disposed within the fuel tank.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Embodiments of the present invention will now be explained with reference to the drawings.

Figure 1:
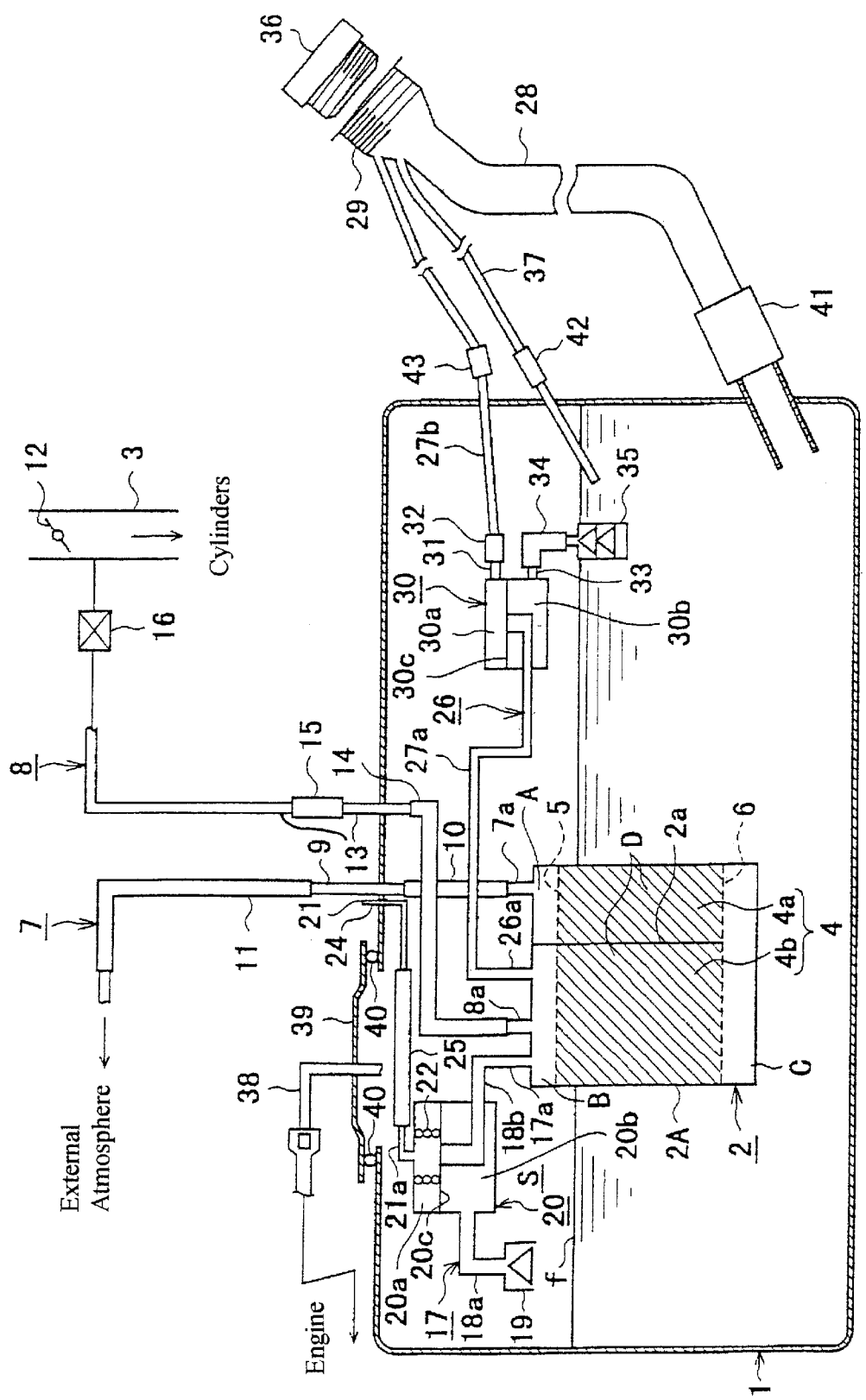
FIG. 1 is a schematic view of an evaporation control apparatus of an in-tank canister system in accordance with a first embodiment of the present invention.

FIG. 1 shows an evaporation control apparatus for an automobile internal combustion engine in accordance with a first embodiment of the present invention. The evaporation control apparatus is adapted to be arranged in a fuel tank 1 of an internal combustion engine and coupled to a suction system of the internal combustion engine. The evaporation control apparatus basically includes a canister 2 and a control valve 20 pressure located within the fuel tank 1 of the internal combustion engine. The canister 2 forms a fuel vapor adsorbent means for temporarily adsorbing fuel vapor generated within the fuel tank of the internal combustion engine, while the control valve 20 forms a control means for selectively supplying fuel vapor from the fuel tank to the canister 2 when pressure within the fuel tank exceeds a prescribed pressure. The canister 2 contains an adsorbent that temporarily adsorbs fuel vapor generated within the fuel tank 1 of the internal combustion engine. The canister 2 and the control valve 20 are configured as a unit to be disposed completely within the fuel tank 1. More particularly, the canister 2 is arranged inside the fuel tank 1 such that fuel vapors and other fuel components such as hydrocarbons that are generated in the fuel tank 1 can be temporarily adsorbed in the canister 2 and such that leakage from the canister 2 and the control valve 20 does not leak into the atmosphere.

The fuel vapor generated within the fuel tank 1 of the internal combustion engine is temporarily absorbed by an adsorbent contained within the canister 2. The control valve 20 is fluidly coupled to the canister 2 to supply fuel vapor from the fuel tank 1 to the canister 2 when pressure within the fuel tank 1 exceeds a prescribed pressure. The interior of the fuel tank 1 is fluidly coupled to the canister 2 via the control valve 20, which has a first evaporation tube 18*a* fluidly coupled to the fuel tank 1 and has a second evaporation tube 18*b* fluidly coupled between the control valve 20 and the canister 2. The control valve 20 has an air release port 21 fluidly coupled thereto for opening and closing the passageway formed by the first evaporation tube 18*a* and the second evaporation tube 18*b*.

The canister 2 has a case body 2A that is made of a resin material and formed as a separate member from the fuel tank 1. The case body 2A is provided with a drain chamber A, a purge chamber B, a communicating chamber C and an adsorbent housing chamber D. The drain chamber A communicates with the external atmosphere through a drain passage 7. The purge chamber B communicates with an air intake passage 3 of the internal combustion engine and an upper space S inside fuel tank 1. The communicating chamber C connects the drain chamber A and the purge chamber B. The adsorbent material housing chamber D is filled with an adsorbent 4 such as activated carbon, which adsorbs fuel components as the fuel vapor moves from the purge chamber B to the drain chamber A. The adsorbent material on the drain chamber A side will be hereinafter referred to as a first adsorbent 4*a*, while the adsorbent material on the purge chamber B side will be referred to as a second adsorbent 4*b*.

The canister 2 further includes a partition wall 2*a* that extends vertically within the case body 2A from an upper wall of the case body 2A to a point close to a lower wall. Accordingly, the adsorbent housing chamber D is partitioned into two chambers by the partition wall 2*a*. The first adsorbent portion of the adsorbent housing chamber D is in fluid communication with the drain chamber A and the communicating chamber C. The second adsorbent portion of the adsorbent housing chamber D is in fluid communication with the purge chamber B and the communicating chamber C. A perforated plate 5 made of punched metal or the like is also provided within the case body 2A with a predetermined spacing from the upper wall. Another perforated plate 6 is provided with a predetermined spacing from the bottom wall, which is also made of punched metal or the like. For instance, the perforated plate 6 can be disposed at the lower end of the partition wall 2*a*. The space between these opposing perforated plates 5 and 6 is filled with adsorbent 4, thereby forming the adsorbent housing chamber D.

The drain chamber A is formed by one of the upper spaces within the case body 2A which is partitioned by the perforated plate 5 and partition wall 2*a*. A drain connector 7*a* is formed in a protruding manner on the upper wall of the case body 2A above the drain chamber A to connect the drain chamber A to the drain passage 7. The other of the upper spaces within the case body 2A forms the purge chamber B. A purge connector 8*a* is provided on the upper wall of the case body 2A above the purge chamber B to connect the purge chamber B to a purge passage 8. Similarly, an evaporation connector 17*a* and a vent connector 26*a* are provided on the upper wall of the case body 2A to connect the purge chamber B to a control valve 20 and to a refueling control valve 30, respectively. The communicating chamber C is formed in a lower space of case body 2A, and is partitioned by the perforated plate 6.

In other words, the canister 2 of this embodiment has a U-shaped flow path or structure, in which drain chamber A and purge chamber B are provided adjacent to each other in the upper portion of case body 2A. Clean air drawn into the drain chamber A through the drain passage 7 passes through the first adsorbent 4*a* on the drain chamber A side of the canister 2 into communicating chamber C. The clean air then passes through the second adsorbent 4*b* on the purge chamber B side of the canister 2 into the purge chamber B.

The drain passage 7 includes a drain pipe 9 and a drain hose 10. The drain pipe 9 passes through an upper wall of fuel tank 1. In other words, one end of the drain pipe 9 is exposed to the atmosphere, while the other end is inside the fuel tank 1. The drain hose 10 is disposed within the fuel tank 1 to connect the lower end of the drain pipe 9 to the drain connector 7*a* of the drain chamber A. In this embodiment, the drain pipe 9 is divided into two pieces outside of fuel tank 1, which are connected by a hose 11.

The purge passage 8 includes a purge pipe 13 and a purge hose 14. The purge pipe 13 passes through the upper wall of fuel tank 1. One end of the purge pipe 13 is communicating with a downstream side of a throttle valve 12 in the air intake passage 3 of the internal combustion engine. The other end of the purge pipe 13 is inside the fuel tank 1. The purge hose 14 is inside the fuel tank 1 to connect the other end of the purge pipe 13 to the purge connector 8*a* of the purge chamber B. In this embodiment, the purge pipe 13 is divided into two pieces outside of the fuel tank 1, which are connected by a hose 15.

A purge control valve 16 is provided on the purge pipe 13. The purge control valve 16 opens in response to the operating conditions of the engine, thereby adjusting the flow of purge gas to the air intake passage 3 of the internal combustion engine.

Both the drain pipe 9 and purge pipe 13 are made of a hard resin material. On the other hand, the hoses 10 and 11 of the drain passage 7 and hoses 14 and 15 of the purge passage 8 are each made of flexible resin material, such that vibrations of the vehicle body can be absorbed.

An evaporation passage 17 includes a first evaporation tube 18*a* and a second evaporation tube 18*b*. The first and second evaporation tubes 18*a* and 18*b* both extend from the control valve 20. The second evaporation tube 18*b* is connected to the evaporation connector 17*a*, which is provided on the upper wall of purge chamber B. The first evaporation tube 18*a* is connected to a fuel cut valve 19 provided in the upper space S of fuel tank 1. In this way, fuel vapors generated in the upper space S flow through the evaporation passage 17 into the purge chamber B. The fuel vapors then flow through chambers D and C where the fuel vapors are adsorbed by the adsorbent material 4, which is contained in the adsorbent housing chamber D.

The fuel cut valve 19 blocks the first evaporation tube 18*a* to prevent fuel from entering the control valve 20 and the purge chamber B of the canister 2. In this way, fuel does not enter the control valve 20 when the fuel cut valve 19 sinks below a fuel surface f of the fuel in the fuel tank 1 due to shifting of the fuel surface f.

The control valve 20 is provided on the evaporation passage 17. The control valve 20 controls the pressure inside fuel tank 1 by supplying fuel vapor to the canister 2 when the pressure inside the fuel tank 1 exceeds a prescribed value.

The control valve 20 includes an atmospheric pressure chamber 20a, an evaporation chamber 20b, a diaphragm 20c and a spring 22. The evaporation pressure chamber 20b communicates with the upper space S of the fuel tank 1 via the first evaporation tube 18a, and with canister 2 via the second evaporation tube 18b. The atmospheric pressure chamber 20a communicates with the external atmosphere via an atmospheric release port 21. The diaphragm 20c separates the evaporation chamber 20b and atmospheric pressure chamber 20a, and opens and/or closes the second evaporation tube 18b. The spring 22 biases the diaphragm 20c to normally close the control valve 20. The control valve 20 has a case body 20A that is made of a resin material.

Figure 2:
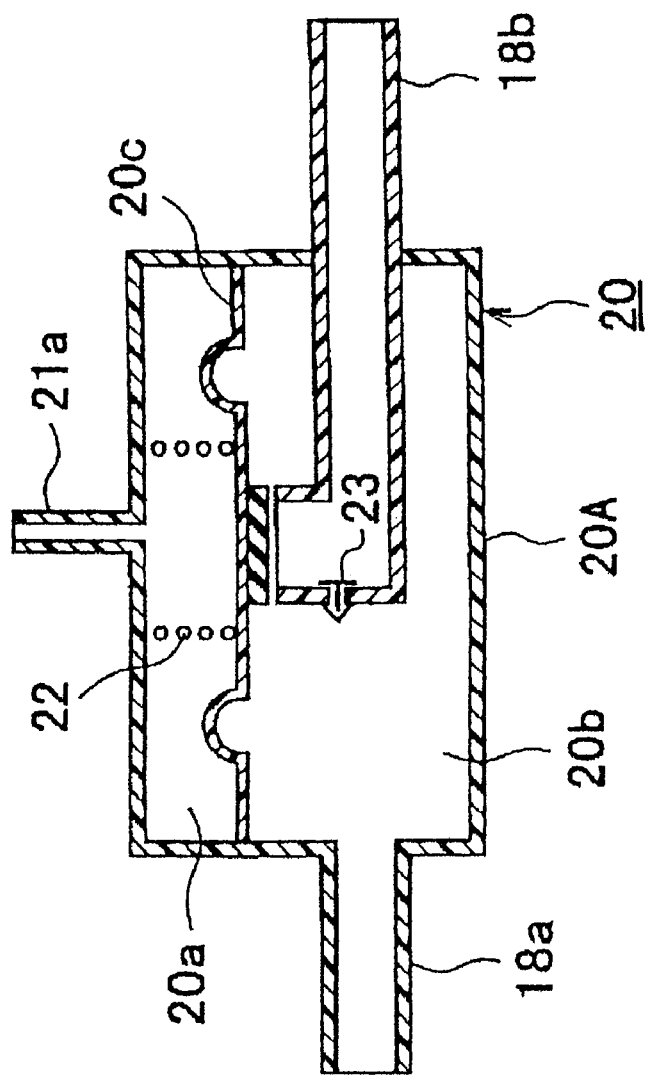
FIG. 2 is an enlarged schematic view of a control valve for the evaporation control apparatus illustrated in FIG. 1 in accordance with the first embodiment of the present invention.

Additionally, as seen in FIG. 2, a negative pressure valve 23 is provided in the evaporation tube 18b. The negative pressure valve 23 is a one-way valve which allows flow of fuel vapor from the second evaporation tube 18b to the evaporation chamber 20b when a negative pressure is created in the fuel tank 1.

In other words, when the pressure within the fuel tank 1 rises due to generation of fuel vapors in the fuel tank 1, and the pressure inside the evaporation chamber 20b rises. When the pressure of the evaporation chamber 20b exceeds the sum of the atmospheric pressure in the atmospheric pressure chamber 20a and the biasing pressure from the spring 22, the diaphragm 20c opens the second evaporation tube 18b.

Therefore, when fuel vapor is generated in the fuel tank 1 and the pressure within the fuel tank exceeds a prescribed pressure, the diaphragm 20c of the control valve 20 opens the control valve 20. In this manner, the fuel vapor generated in the fuel tank 1 flows into the canister 2. Then, the fuel vapor is adsorbed by the adsorbent 4 in the canister 2 to be temporarily stored therein.

On the other hand, when the fuel tank 1 cools due to the influence of the outside air, and the pressure in the fuel tank 1 becomes negative, the negative pressure valve 23 opens and allows fuel vapor to enter the evaporation chamber 20b through the second evaporation tube 18b.

Thus, the control valve 20 maintains the pressure inside the fuel take 1 at approximately a fixed pressure. The control valve 20 also prevents fuel vapor generated in the fuel tank 1 from being released into the atmosphere.

The atmospheric release port 21 is provided outside the fuel tank 1. The atmospheric release port 21 is connected to a connector 21a of the control valve 20, and includes a pipe 24 and a hose 25. The pipe 24 passes through the upper wall of fuel tank 1. One end of the pipe 24 opens to the atmosphere, thereby forming the atmospheric release port 21. Meanwhile, the other end of the pipe 24 protrudes into fuel tank 1, and is connected to the connector 21a of the control valve 20 via the hose 25.

When the internal combustion engine is started, negative pressure is created in the air intake passage 3 due to the air intake therein. The negative pressure is transmitted through chambers A, C and D to the purge chamber B. Then, the fuel vapor stored in the canister 2 is sucked into the purge passage 8 along with the outside air drawn through the drain passage 7. The air and fuel vapor then pass through the air intake passage 3 and are delivered into cylinders of the internal combustion engine as purge gas.

A vent path 26 is connected to the vent connector 26a, which is provided in a protruding manner on the upper wall of purge chamber B. The vent path 26 has a first vent tube 27a, a second vent tube 27b and a refueling control valve 30. The first vent tube 27a is connected to the vent connector 26a and the refueling control valve 30. The second vent tube 27b passes through the wall of the fuel tank 1. One end of the second vent tube 27b is disposed adjacent to a filler port 29 of a filler pipe 28 to communicate with the filler pipe 28. The refueling control valve 30 is disposed between the first and second vent tubes 27a and 27b.

The refueling control valve 30 has an atmospheric chamber 30a, an evaporation chamber 30b and a diaphragm valve 30c which separates the atmospheric chamber 30a from the evaporation chamber 30b. By opening and closing the diaphragm valve 30c, an end of the first vent tube 27a inside the refueling control valve 30 can be opened and closed.

The atmospheric chamber 30a has a connector 31 that is connected to the second vent tube 27b via a resin hose 32. Therefore, the atmospheric chamber 30a opens to a position close to the filler port 29 via the second vent tube 27b and the resin hose 32 in order to communicate with the filler pipe 28a. The evaporation chamber 30b is connected to a vent cut valve 35 via a connector 33 and a resin hose 34. The vent cut valve 35 prevents the fuel from coming into the canister 2 when the fuel surface f reaches the vent cut valve 35. In this manner, the evaporation chamber 30b communicates with the inside of the fuel tank 1 through the vent cut valve 35.

The atmospheric chamber 30a normally has a pressure that is substantially the same as the pressure within the fuel tank 1. During refueling, however, due to the flow of fuel in the filler tube 28, the pressure in an area adjacent to the flow of the fuel decreases. Besides, a substantial amount of fuel evaporates during refueling. Consequently, the vent path 26 keeps the diaphragm valve 30c of the refueling control valve 30 open during refueling, until the fuel reaches the vent cut valve 35. While the diaphragm valve 30c is open, the first vent tube 27a is allowed to communicate with the evaporation chamber 30b. Accordingly, fuel vapors generated inside the fuel tank 1 moves through the vent cut valve 35 into the evaporation chamber 30b. The fuel vapor exits the evaporation chamber 30b via the first vent tube 27a, where the fuel vapor flows into the purge chamber B of the canister 2. The fuel vapors are then adsorbed by the second adsorbent material 4b on the purge chamber B side of the adsorbent housing chamber D. Therefore, during refueling, fuel vapors from the fuel tank 1 are adsorbed by the canister 2 without the fuel vapor ever leaving the fuel tank 1.

A filler cap 36 closes the filler pipe 28. A pressure detection pipe 37 stops refueling from a filler nozzle, which is not shown in figures. The filler pipe 28, the detection pipe 37 and the second vent tube 27b are each divided into two portions outside the fuel tank 1, which are respectively connected by resins hoses 41, 42 and 43. The resin hoses 41, 42, and 43 are made of a flexible resin material to absorb vibrations of the vehicle body.

A feed pipe 38 supplies fuel from the fuel tank 1 to a fuel supply system of the internal combustion engine via a fuel pump, which is not shown in figures. The feed pipe 38 is connected to a lid 39 of the fuel tank 1, which is provided on the upper wall of the fuel tank 1. A sealing member 40 seals the opening between the lid 39 and the upper wall of the fuel tank 1.

In this embodiment, the canister 2 and the control valve 20 are both arranged inside the fuel tank 1. Therefore, even when the pressure within the evaporation chamber 20b and the evaporation passage 17 exceeds the atmospheric pressure as the internal pressure of fuel tank 1 increases, the evaporation passage 17, which connects the canister 2 to the control valve 20, is completely enclosed within the fuel tank 1. Thus, even if fuel components permeate hoses and joints that connect pipes and the like to the control valve 20 or the case body 20A of control valve 20, the fuel components will merely escape into the fuel tank 1. Accordingly, the evaporation control apparatus in accordance with the embodiment thus prevents the emission of fuel components into the atmosphere.

Furthermore, in this embodiment, the control valve 20 has a simple structure. More specifically, the control valve 20 only has the evaporation chamber 20b, the atmospheric pressure chamber 20a and the diaphragm 20c without requiring any further complicated structure. In other words, the control valve 20 can be formed with a simpler structure using a conventional resin. Therefore, the cost of manufacturing the control valve 20 does not increase.

Also, the canister 2 has a U-shaped flow path or structure in which the drain chamber A and the purge chamber B are provided adjacent to each other. Since the fuel vapor flows through the drain chamber A and the purge chamber B in the U-shaped flow path or structure, the flow path within the case body 2A of the canister 2 can be lengthened. Accordingly, the efficiency with which the adsorbent material adsorbs fuel vapor can be increased.

Second Embodiment

Figure 3:
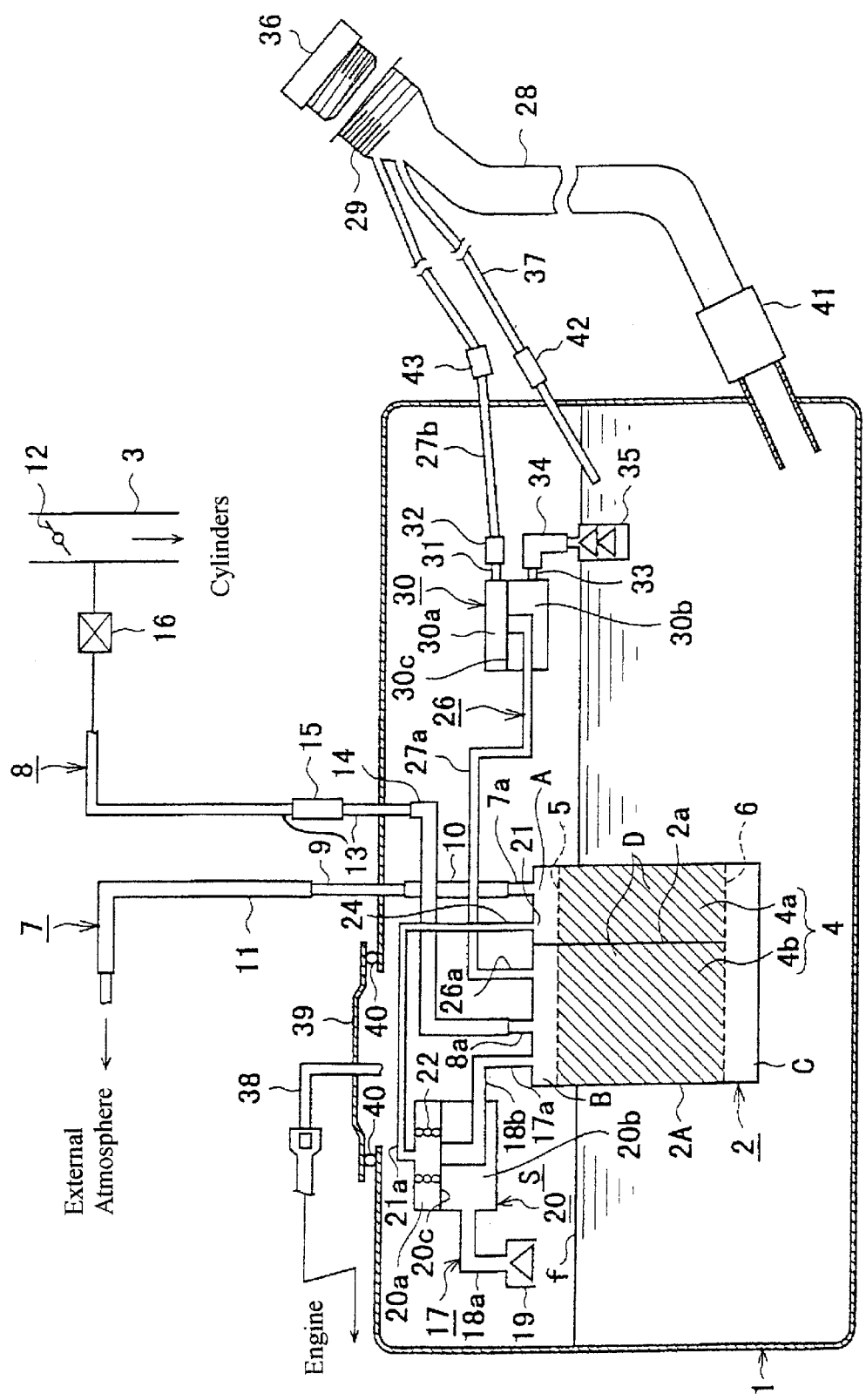
FIG. 3 is a schematic view of an evaporation control apparatus of an in-tank canister system in accordance with a second embodiment of the present invention.

Referring now to FIG. 3, a second embodiment of the present invention will now be explained. The second embodiment of the present invention is a modified version of the first embodiment discussed above. In view of the similarity between the first and second embodiments, the components of this second embodiment that have the same function as the components of the first embodiment are given the identical reference numerals. Thus, the components of the second embodiment that are similar to the components of the first embodiment, discussed above, will not be discussed in detail with reference to the second embodiment. Only those components and their operations of the second embodiment that are different in structure and function from that of the first embodiment will be explained with reference to the second embodiment.

This second embodiment is different from the first embodiment in that the atmospheric release port 21 of the control valve 20 communicates with the drain chamber A of the canister 2, instead of being exposed directly to the external atmosphere. More specifically, the pipe 24 of the atmospheric release port 21 fluidly connects the atmospheric pressure chamber 20a of the control valve 20 to the drain chamber A of the canister 2. Accordingly, the atmospheric release port 21 opens to the drain chamber A. The other end of the atmospheric release port 21 is connected to the connector 21a of the control valve 20.

Therefore, the structure of the second embodiment provides additional effects besides the effects of the first embodiment. More specifically, when fuel components permeates the diaphragm 20c and leak through the atmospheric release port 21, the fuel components will merely escape into the drain chamber A of the canister 2 to be adsorbed by the first adsorbent material 4a, which is contained adjacent the drain chamber A. In this manner, the evaporation control apparatus in accordance with the second embodiment can further prevent the emission of fuel vapor from leaking into the atmosphere.

Furthermore, since the drain chamber A communicates with the external atmosphere, the pressure within the drain chamber A is not easily affected by the pressure gradient caused by the resistance of layers of the adsorbent 4. Therefore, the pressure within the drain chamber A is maintained closer to the atmospheric pressure than in any other section of canister 2. Therefore, it is possible to always operate the control valve 20 at a substantially atmospheric pressure. Accordingly, it is possible to secure the responsiveness of the control valve 20.

In this embodiment, the control valve 20 has a simple structure similar to the first embodiment. Moreover, in this embodiment, there is no need to make the diaphragm 20c of the control valve 20 out of a permeation-resistant resin. In other words, the control valve 20 can be formed with a simpler structure using a conventional resin. Therefore, the cost of manufacturing the control valve 20 does not increase.

Third Embodiment

Figure 4:
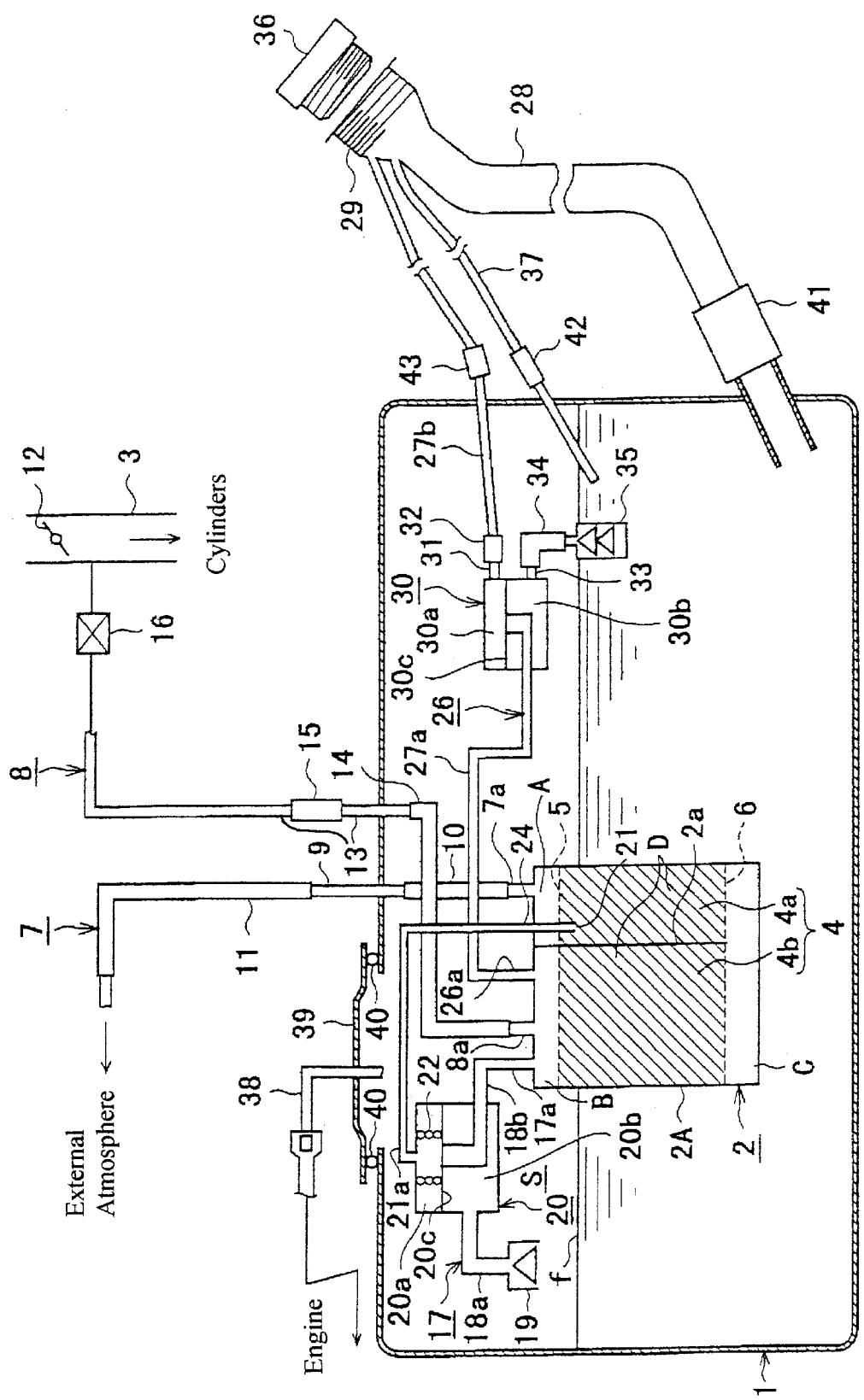
FIG. 4 is a schematic view of an evaporation control apparatus of an in-tank canister system in accordance with a third embodiment of the present invention.

Referring now to FIG. 4, a third embodiment of the present invention will now be explained. The third embodiment of the present invention is a modified version of the first embodiment discussed above. In view of the similarity between the first and third embodiments, the components of this third embodiment that have the same function as the components of the first embodiment are given the identical reference numerals. Thus, the components of the third embodiment that are similar to the components of the first embodiment, discussed above, will not be discussed in detail with reference to the third embodiment. Only those components and their operations of the third embodiment that are different in structure and function from that of the first embodiment will be explained with reference to the third embodiment.

The third embodiment is different from the first embodiment in that the atmospheric relief port 21 of control valve 20 communicates with the adsorbent housing chamber D. More specifically, in the third embodiment, the pipe 24 which forms the atmospheric release port 21 extends into the drain chamber A side of the adsorbent housing chamber D. The other end of the pipe 24 is connected to the connector 21a of the control valve 20. Accordingly, the atmospheric release port 21 opens into the layer of first adsorbent material 4a, which is contained adjacent the drain chamber A of the canister 2.

The structure of the third embodiment provides additional effects besides the effects of the first embodiment. More specifically, even when fuel components in the evaporation chamber 20b permeate the diaphragm 20c of the control valve 20 and leak through the atmospheric release port 21, the fuel components will merely escape into the drain chamber A side of the adsorbent housing chamber D. Since the adsorbent housing chamber D is filled with the first adsorbent material 4a, the fuel components will be securely adsorbed by the first adsorbent material 4a. In this manner, the evaporation control apparatus in accordance with the third embodiment can prevent the emission of fuel vapor into the atmosphere.

Furthermore, since the atmospheric release port 21 opens near the drain chamber A, and since the pressure in the drain chamber A is closer to the atmospheric pressure than in any other parts of the canister 2, the control valve 20 can be controlled with substantially atmospheric pressure. Accordingly, it is possible to secure the responsiveness of the control valve 20. At the same time, the efficiency with which the fuel components are adsorbed can be increased.

In this embodiment, the control valve 20 has a simple structure similar to the first embodiment. Moreover, in this embodiment, there is no need to make the diaphragm 20c of the control valve 20 out of a permeation-resistant resin. In other words, the control valve 20 can be formed with a simpler structure using a conventional resin. Therefore, the cost of manufacturing the control valve 20 does not increase.

Fourth Embodiment

Figure 5:
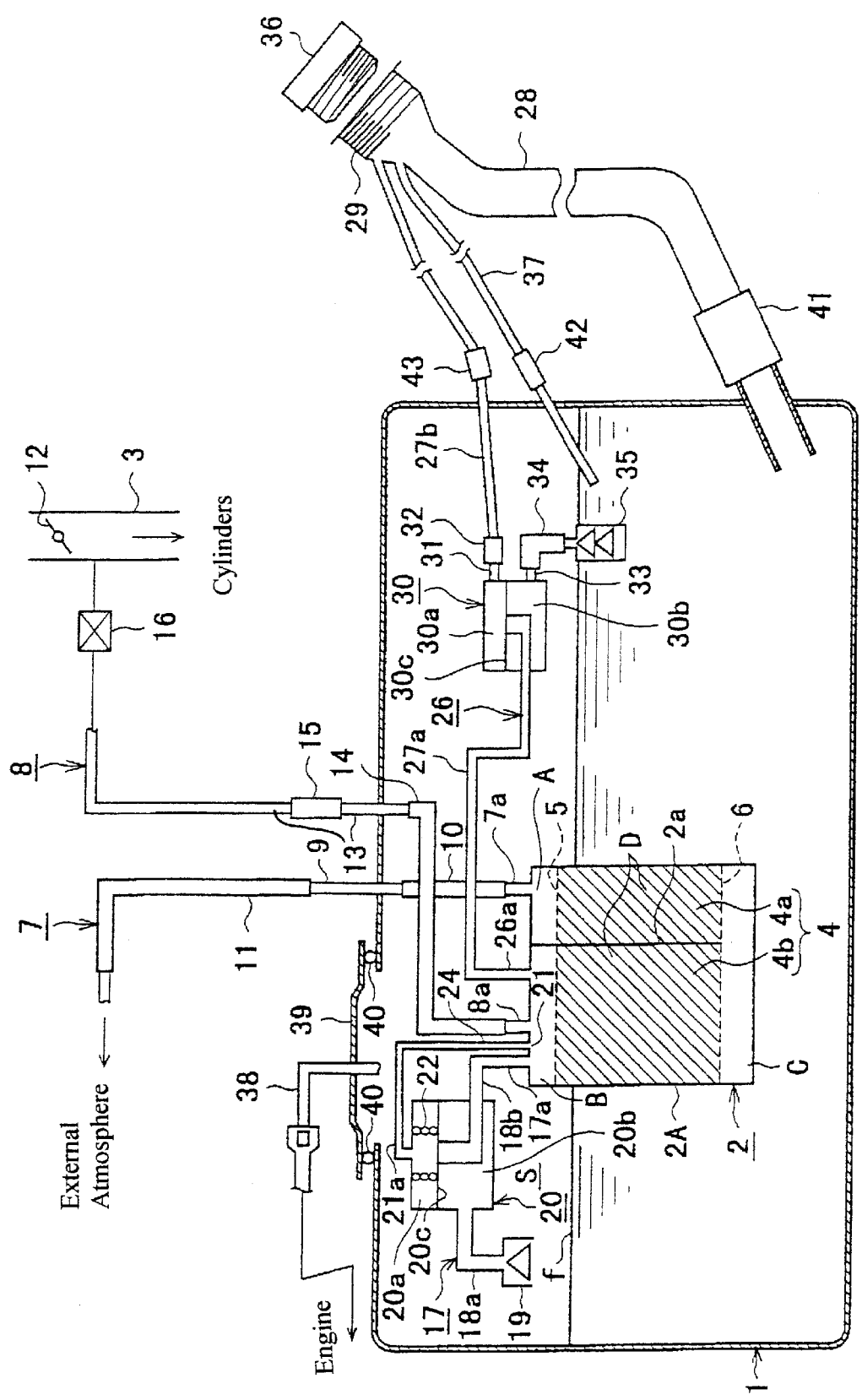
FIG. 5 is a schematic view of an evaporation control apparatus of an in-tank canister system in accordance with a fourth embodiment of the present invention.

Referring now to FIG. 5, a fourth embodiment of the present invention will now be explained. The fourth embodiment of the present invention is a modified version of the first embodiment discussed above. In view of the similarity between the first and fourth embodiments, the components of this fourth embodiment that have the same function as the components of the first embodiment are given the identical reference numerals. Thus, the components of the fourth embodiment that are similar to the components of the first embodiment, discussed above, will not be discussed in detail with reference to the fourth embodiment. Only those components and their operations of the fourth embodiment that are different in structure and function from that of the first embodiment will be explained with reference to the fourth embodiment.

FIG. 5 shows an evaporation control apparatus in accordance with a fourth embodiment of the present invention. This embodiment is different from the previous embodiments in that the atmospheric release port 21 of control valve 20 communicates with the purge chamber B of the canister 2. More specifically, the pipe 24 extends into the purge chamber B of the canister 2. The other end of the pipe 24 is connected to the connector 21a of the control valve 20.

Therefore, the structure of the fourth embodiment provides additional effects besides the effects of the first embodiment. More specifically, even when fuel components in the evaporation chamber 20b permeate the diaphragm 20c of the control valve 20 and leak through the atmospheric release port 21, the fuel components will merely escape into the purge chamber B of canister 2. Then the fuel components will be adsorbed by the second adsorbent material 4b, which is contained adjacent the purge chamber B side of the adsorbent housing chamber D of the canister 2. In this manner, the evaporation control apparatus in accordance with the fourth embodiment can prevent the emission of fuel vapor into the atmosphere.

Furthermore, since the atmospheric release port 21 opens into the purge chamber B, the longest possible flow path can be established between the atmospheric release port 21 and the drain chamber A that communicates with the atmosphere. As a result, the fuel components can be adsorbed with a high efficiency.

In this embodiment, the control valve 20 has a simple structure similar to the first embodiment. Moreover, in this embodiment, there is no need to make the diaphragm 20c of the control valve 20 out of a permeation-resistant resin. In other words, the control valve 20 can be formed with a simpler structure using a conventional resin. Therefore, the cost of manufacturing the control valve 20 does not increase.

Fifth Embodiment

Figure 6:
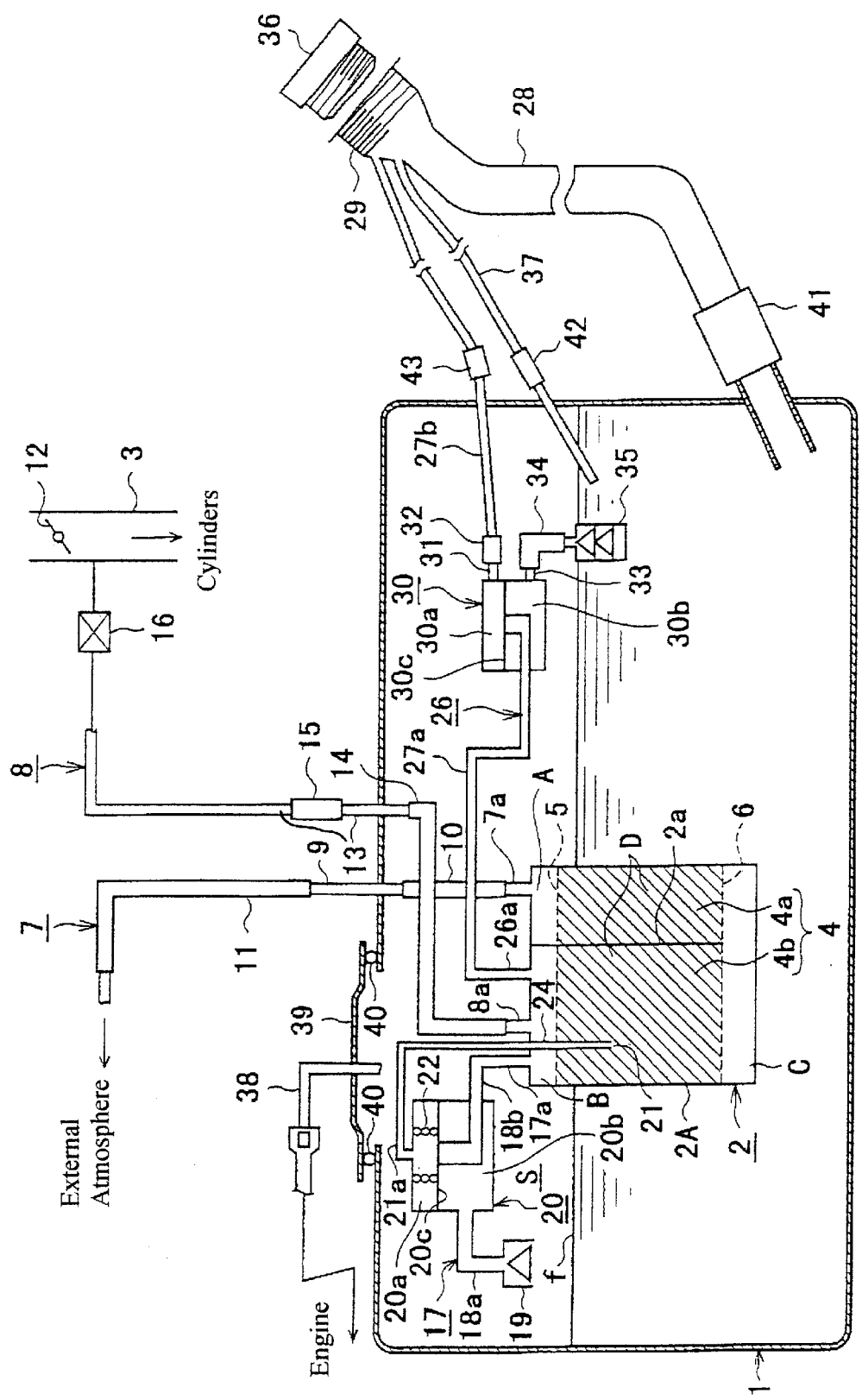
FIG. 6 is a schematic view of an evaporation control apparatus of an in-tank canister system in accordance with a fifth embodiment of the present invention.

Referring now to FIG. 6, a fifth embodiment of the present invention will now be explained. The fifth embodiment of the present invention is a modified version of the first embodiment discussed above. In view of the similarity between the first and fifth embodiments, the components of this fifth embodiment that have the same function as the components of the first embodiment are given the identical reference numerals. Thus, the components of the fifth embodiment that are similar to the components of the first embodiment, discussed above, will not be discussed in detail with reference to the fifth embodiment. Only those components and their operations of the fifth embodiment that are different in structure and function from that of the first embodiment will be explained with reference to the fifth embodiment.

This fifth embodiment is different from the previous embodiments in that the atmospheric release port 21 of the control valve 20 communicates with the purge chamber B side of the adsorbent housing chamber D. More specifically, the pipe 24 extends into a layer of the second adsorbent material 4b which is contained in the portion of the adsorbent housing chamber D that is adjacent the purge chamber B side of the canister 2. The other end of the pipe 24 is connected to the connector 21a of the control valve 20. Therefore, the pipe 24 connects the atmospheric chamber 20a of the control valve 20 with the adsorbent housing chamber D of the canister 2.

Therefore, the structure of the fifth embodiment provides additional effects besides the benefits of the first embodiment. More specifically, even when fuel components in the evaporation chamber 20b permeate the diaphragm 20c of the control valve 20 and leak from the atmospheric release port 21, the fuel components will merely escape into the second adsorbent 4b, which is contained in the purge chamber B side of the adsorbent housing chamber D. Then, the fuel components will be securely adsorbed by the adsorbent material 4b, which fills the adsorbent housing chamber D. In this manner, the evaporation control apparatus in accordance with the fifth embodiment can prevent the emission of fuel vapor into the atmosphere.

Furthermore, since the atmospheric release port 21 opens close to the purge chamber B, a long flow path can be established between the atmospheric release port 21 and the drain chamber A that communicates with the atmosphere. As a result, fuel components can be adsorbed with a high efficiency.

Additionally, since the atmospheric release port 21 opens closer to the drain chamber A than in the fourth embodiment, the control valve 20 can be controlled with a pressure that is slightly closer to the atmospheric pressure. Thus, the responsiveness of the control valve 20 can be improved over the fourth embodiment.

In this embodiment, the control valve 20 has a simple structure similar to the first embodiment. Moreover, in this embodiment, there is no need to make the diaphragm 20c of the control valve 20 out of a permeation-resistant resin. In other words, the control valve 20 can be formed with a simpler structure using a conventional resin. Therefore, the cost of manufacturing the control valve 20 does not increase.

Sixth Embodiment

Figure 7:
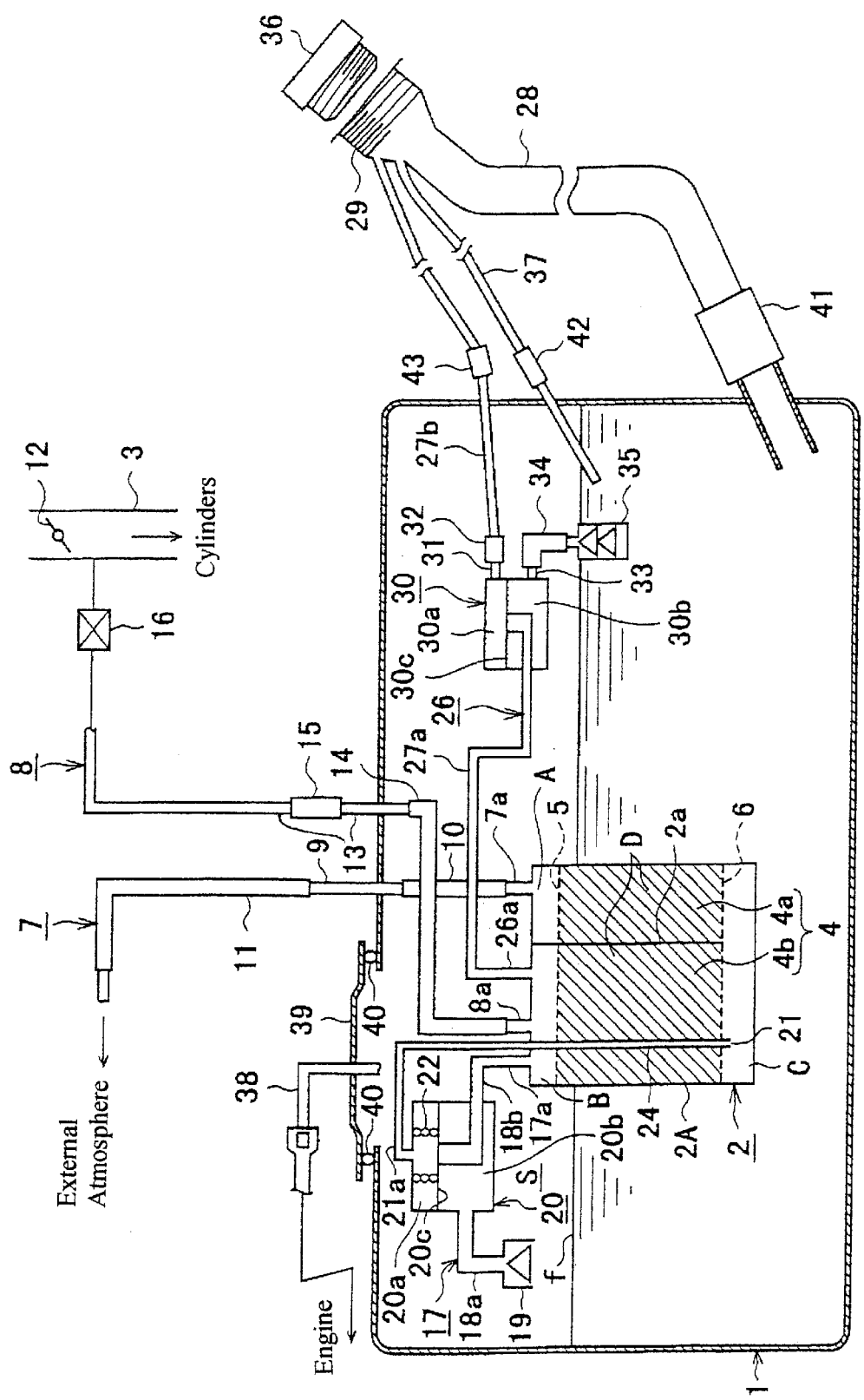
FIG. 7 is a schematic view of an evaporation control apparatus of an in-tank canister system in accordance with a sixth embodiment of the present invention.

Referring now to FIG. 7, a sixth embodiment of the present invention will now be explained. The sixth embodiment of the present invention is a modified version of the first embodiment discussed above. In view of the similarity between the first and sixth embodiments, the components of this sixth embodiment that have the same function as the components of the first embodiment are given the identical reference numerals. Thus, the components of the sixth embodiment that are similar to the components of the first embodiment, discussed above, will not be discussed in detail with reference to the sixth embodiment. Only those components and their operations of the sixth embodiment that are different in structure and function from that of the first embodiment will be explained with reference to the sixth embodiment.

This sixth embodiment is different from the previous embodiments in that the atmospheric release port 21 of the control valve 20 communicates with the communicating chamber C of the canister 2. More specifically, the pipe 24 extends into the communicating chamber C of canister 2. The other end of the pipe 24 is connected to the connector 21a of the control valve 20. In this manner, the atmospheric release port 21 opens to the communicating chamber C of the canister 2.

Therefore, the sixth embodiment provides additional effects besides the effects of the first embodiment. More specifically, even when fuel components permeate the diaphragm 20c of the control valve 20 and leak from the atmospheric release port 21, the fuel components will merely escape into the communicating chamber C of the canister 2. Then, the fuel components will be adsorbed by the adsorbent 4 contained in the canister 2. In this manner, the evaporation control apparatus of this embodiment can prevent the emission of fuel vapor into the atmosphere.

Furthermore, since the atmospheric release port 21 opens into the communicating chamber C, a prescribed length is secured for the flow path between the atmospheric release port 21 and the drain chamber A that communicates with the atmosphere. As a result, an adsorbing efficiency can be ensured. Also at the same time, the responsiveness of the control valve 20 can be ensured because the effects of the pressure gradient caused by the resistance of adsorbent 4 are suppressed. Accordingly, and the control valve 20 can be controlled with a substantially atmospheric pressure.

In this embodiment, the control valve 20 has a simple structure similar to the first embodiment. Moreover, in this embodiment, there is no need to make the diaphragm 20c of the control valve 20 out of a permeation-resistant resin. In other words, the control valve 20 can be formed with a simpler structure using a conventional resin. Therefore, the cost of manufacturing the control valve 20 does not increase.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

This application claims priority to Japanese Patent Application No. H11-336578. The entire disclosure of Japanese Patent Application No. H11-336578 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. For example, although the first through sixth embodiments described herein are arranged so that U-shaped flow structure of the canister 2 is oriented vertically inside the fuel tank 1, it is also possible to place the canister 2 such that the U-shaped flow path is oriented horizontally. Also, the canister 2 used in the first through fifth embodiments is not limited to a canister with the aforementioned U-turn structure. A conventional straight-flow type canister can also be utilized.

Accordingly, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. An evaporation control apparatus adapted to be arranged in a fuel tank of an internal combustion engine and coupled to a suction system of the internal combustion engine, said evaporation control apparatus comprising:
    a canister containing an adsorbent that temporarily adsorbs fuel vapor generated within the fuel tank of the internal combustion engine; and
    a control valve fluidly coupled to said canister to supply fuel vapor from the fuel tank to said canister when pressure within the fuel tank exceeds a prescribed pressure, said canister and said control valve being configured as a unit to be disposed within the fuel tank.

2. The evaporation control apparatus as set forth in claim 1, wherein said control valve includes an evaporation chamber fluidly coupled to the fuel tank via a first evaporation passage and said canister via a second evaporation passage, an atmospheric pressure chamber fluidly coupled to external atmosphere via an atmospheric release port, and a diaphragm between said evaporation chamber and said atmospheric chamber and arranged to open and close said second evaporation passage.

3. The evaporation control apparatus as set forth in claim 2, wherein
    said atmospheric release port of said control valve is fluidly coupled to a portion of said canister that is fluidly coupled to the external atmosphere.

4. The evaporation control apparatus as set forth in claim 2, wherein
    said canister has a purge chamber, a drain chamber and an adsorbent housing chamber that is fluidly coupled between said purge chamber and said drain chamber.

5. The evaporation control apparatus as set forth in claim 4, wherein
    said adsorbent housing chamber includes a first adsorbent portion that is fluidly coupled to said purge chamber and a second adsorbent portion that is fluidly coupled to said drain chamber, said first and second adsorbent portions being fluidly coupled together by a communicating chamber.

6. The evaporation control apparatus as set forth in claim 4, wherein
    said purge chamber is fluidly coupled to said second evaporation passage and said drain chamber that is fluidly coupled to the external atmosphere.

7. The evaporation control apparatus as set forth in claim 4, wherein
    said purge chamber, said drain chamber and said adsorbent housing chamber are arranged to form a U-shaped flow path in which said drain chamber and said purge chamber are adjacent to each other.

8. The evaporation control apparatus as set forth in claim 6, wherein
    said atmospheric release port of said control valve is fluidly attached to said drain chamber of said canister.

9. The evaporation control apparatus as set forth in claim 6, wherein
    said atmospheric release port of said control valve is fluidly attached to said first adsorbent portion of the said canister.

10. The evaporation control apparatus as set forth in claim 6, wherein
    said atmospheric release port of said control valve is fluidly attached to said purge chamber of said canister.

11. The evaporation control apparatus as set forth in claim 6, wherein said atmospheric release port of said control valve is fluidly attached to said second adsorbent portion of said canister.

12. The evaporation control apparatus as set forth in claim 6, wherein a communicating chamber is defined between said purge chamber and said drain chamber to communicate therebetween; and said atmospheric release port of said control valve is fluidly attached to said communicating chamber.

13. The evaporation control apparatus as set forth in claim 4, further comprising a purge passage that connects an air intake passage of the suction system with said canister.

14. The evaporation control apparatus as set forth in claim 13, wherein said purge passage is fluidly attached to said purge chamber of said canister.

15. The evaporation control apparatus as set forth in claim 14, further comprising a purge control valve disposed on said purge passage to adjust flow of fuel vapor to the air intake passage of the suction system.

16. The evaporation control apparatus as set forth in claim 15, further comprising a refueling control valve fluidly coupled to said canister to supply fuel vapor from the fuel tank to said canister during refueling, said canister and said refueling control valve being configured as a unit to be disposed within the fuel tank.

17. The evaporation control apparatus as set forth in claim 16, wherein said refueling control valve includes an evaporation chamber fluidly coupled to the fuel tank via a vent cut valve, an atmospheric chamber fluidly coupled between said canister and a filler pipe of the fuel tank via first and second vent tubes, respectively, and a diaphragm located between said evaporation chamber and said atmospheric chamber and arranged to open and close said second evaporation passage.

18. An evaporation control apparatus adapted to be arranged in a fuel tank of an internal combustion engine and coupled a suction system of the internal combustion engine, said evaporation control apparatus comprising:

fuel vapor adsorbent means for temporarily adsorbing fuel vapor generated within the fuel tank of the internal combustion engine; and control means for selectively supplying fuel vapor from the fuel tank to said fuel vapor adsorbent means when pressure within the fuel tank exceeds a prescribed pressure, said fuel vapor adsorbent means and said control means being configured as a unit to be disposed within the fuel tank.

\* \* \* \* \*